LIQUID FILTRATION

Original Filed Oct. 19, 1953 5 Sheets-Sheet 1

Inventor
Kenneth Ernest Buckman
H. E. Jones
Attorney

LIQUID FILTRATION

Original Filed Oct. 19, 1953 5 Sheets-Sheet 2

Inventor
Kenneth Ernest Buckman
L. E. Jones
Attorney

Inventor
Kenneth Ernest Buckman
H. E. Jones
Attorney

Inventor
Kenneth Ernest Buckman
H. B. Jones
Attorney

Inventor
Kenneth Ernest Buckman
H. E. Jones
Attorney

United States Patent Office

Re. 24,509
Reissued July 29, 1958

24,509

LIQUID FILTRATION

Kenneth Ernest Buckman, Redbridge, Southampton, England, assignor to General Motors Corporation, Detroit, Mich., a corporation of Delaware Original No. 2,792,124, dated May 14, 1957, Serial No. 386,926, October 19, 1953. Application for reissue September 11, 1957, Serial No. 683,434

Claims priority, application Great Britain November 28, 1952

5 Claims. (Cl. 210—487)

Matter enclosed in heavy brackets [ ] appears in the original patent but forms no part of this reissue specification; matter printed in italics indicates the additions made by reissue.

This invention relates to liquid filters and particularly to those having sheet filtering material which is folded and formed around a central cylindrical element to form a series of double-wall, radially disposed folds, so that in cross section the filter element somewhat resembles the spokes of a wheel or a star.

The general object of the invention is to increase the effective filter area for a given volume of filter and thereby to increase the filter efficiency of a given size of filter.

This is effected by forming the outer edge of the double walls of a fold with one or more secondary folds of re-entrant form.

Thus *there* [theer] may be one secondary *re-entrant* [reentrant] fold of a main fold extending radially inwardly say one half of the radial depth of the main fold. In cross-section such folds have the general form of a Y.

Another form of filter has a series of two or more such re-entrant folds successively of increasing radial depth.

A further form incorporates a main secondary re-entrant fold of a radial depth of say two-thirds of that of a main fold, and two tertiary folds one in each limb formed by the secondary fold, of a depth of say one third of that of a main fold. In cross-section such folds can have the form of a Y with each ascendent of the Y being a Y itself. Alternatively the secondary and tertiary folds can be formed like the branches of a tree extending radially outwardly of the main fold but with each branch fold comprising layers not only contacting each other but forming exterior walls of that branch fold.

These secondary, or secondary and tertiary folds, can be formed in each main fold or in alternate main folds, or, for example, in one in every three or four main folds.

By such formations of folds, the thickness of the sludge builds up on the outside of the sheet material in a more uniform manner than with the usual star-shaped filter, more use is made of the outer parts of the V-shaped pockets formed by the main folds, and the diameter of the unused inner space can thereby be decreased to a minimum.

Further objects and advantages of the present invention will be apparent from the following description, reference being made to the accompanying drawings which show preferred forms of the invention, and in which.

Figure 1:
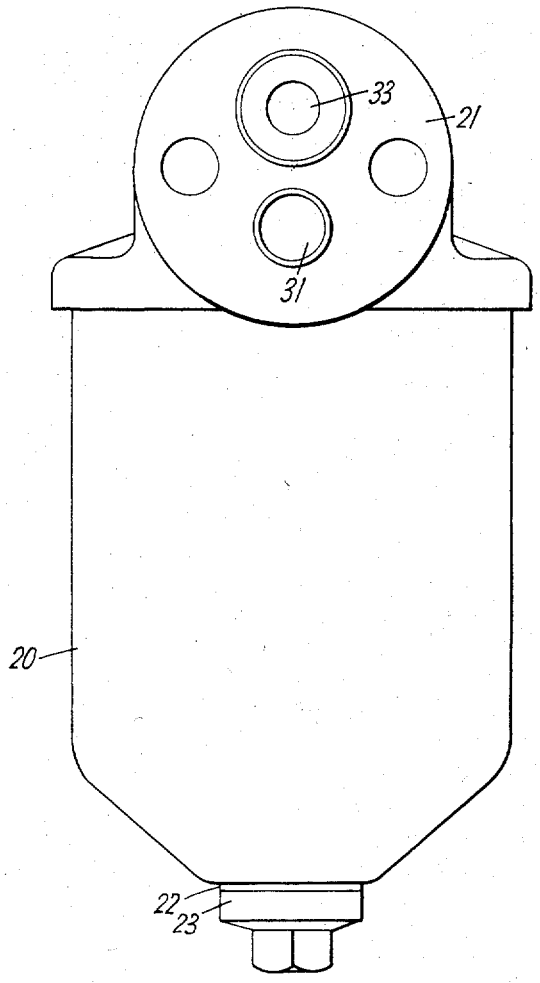
Fig. 1 is an elevation of an oil filter unit comprising a filter element embodying the invention.
Figure 2:
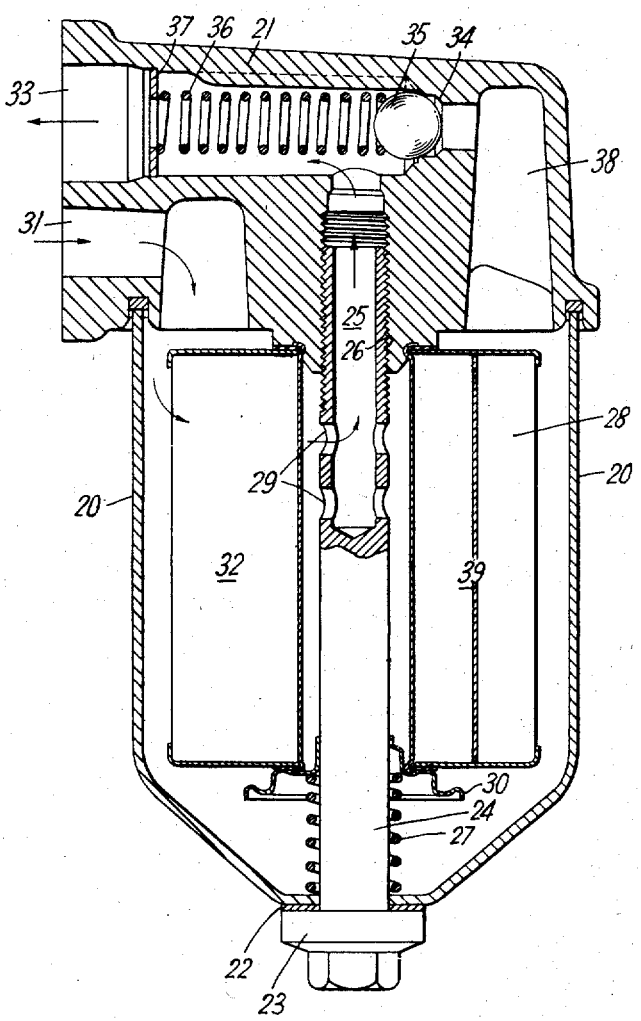
Fig. 2 is a side elevation, partly in section of the same unit.

The oil filter unit shown in Figs. 1 and 2 comprises a light metallic casing 20 sealed at one end to an "inlet and outlet" assembly 21 and sealed at the other end by a rubber washer 22 and a nut 23 which is threaded onto one end of a hollow tie-bolt 24. The other end 25 of the tie-bolt is threaded into a channel 26 in the assembly 21.

Supported between the assembly 21 and a coil spring 27 on tie-bolt 24 is an annular filter element 28. Between the spring 27 and *element* [elements] 28 is a dished support member 30. The part of tie-bolt 24 which passes through the element 28 has a plurality of apertures 29.

The assembly 21 has an inlet passage 31 which gives access to the space between the part 32 of the filter element 28 and the casing 20. The channel 26 connects with an outlet passage 33, one end 34 of which is normally closed by a ball valve 35 held in position by a spring 36 which abuts a flange 37 depending from the wall of passage 33. The valve 35 controls access to a passage 38 which leads to the part 39 of filter element 28.

Figure 3:
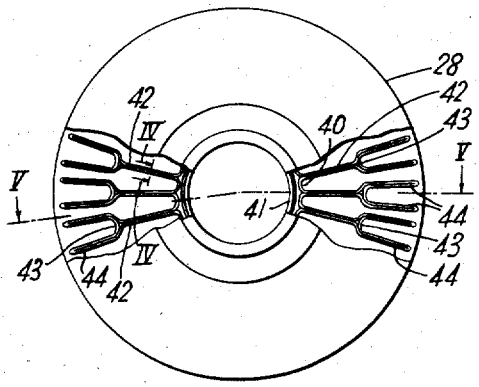
Fig. 3 is a plan, partly in section of a filter element embodying the invention.
Figure 4:
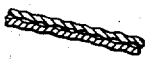
Fig. 4 is a section on line IV—IV of Fig. 3.
Figure 5:
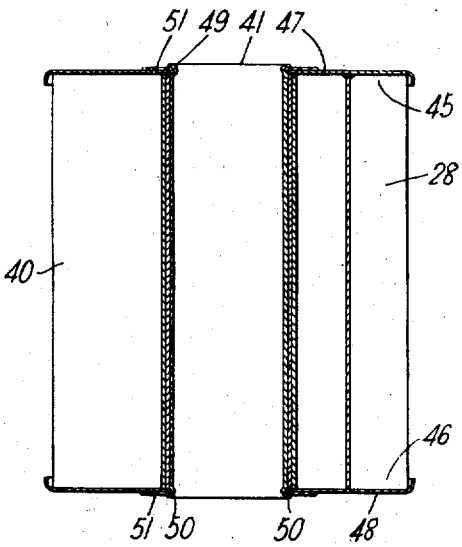
Fig. 5 is a section on line V—V of Fig. 3.

The filter element 28 shown in Figures 3, 4 and 5 comprises a sheet of paper filtering material 40 which is folded and formed round a central perforated cylindrical element 41 to form a series of double-wall radially disposed folds 42 so that in cross-section (Figure 3) the folds 42 resemble the spokes of a wheel. The material is initially in sheet form, and is cut to length and width before folding. Preferably the material is a porous paper impregnated with a phenol formaldehyde or like resin. Each fold 42 has a secondary fold 43 of re-entrant form which, in effect, bifurcates each "spoke" so that each fold 43 has two radially extending branch folds 44. The material 40 is corrugated (Figure 4) so as to provide flow space *between* the contacting exterior layers which space extends to the perforated element 41. The clarified fluid then has ample access to the apertures 29.

The ends 45 and 46 of the folds of element 28 are sealed to and contained between annular end plates 47 and 48 respectively. The ends 49 and 50 of the cylindrical element 41 are crimped over washers 51 so as to hold the plates 47 and 48 tightly against the ends 45 and 46, respectively, of the element 28. The folds of the element 28 are also sealed to the plates by adhesive.

Figure 6:
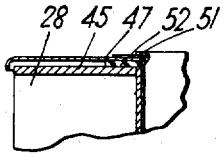
Fig. 6 is an elevation of a modified detail.

An alternative method of end sealing is shown in Figure 6 wherein the ends of the folds of the element 28 are sealed by adhesive (shaded area) and a central washer 52 seals the inner part of the ends of folds to the plate 47.

Figure 7:
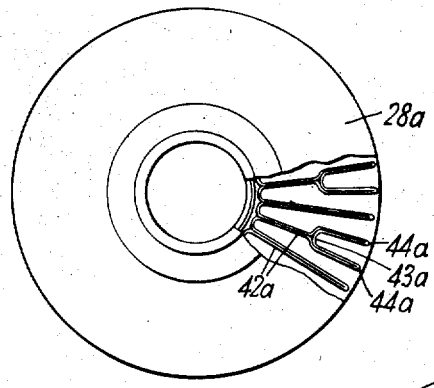
Fig. 7 is a plan, partly in section, of another filter element embodying the invention.

The filter element 28a, shown in Figure 7, is of similar construction to element 28 except that only alternate folds 42a have secondary folds 43a and branch folds 44a.

Figure 8:
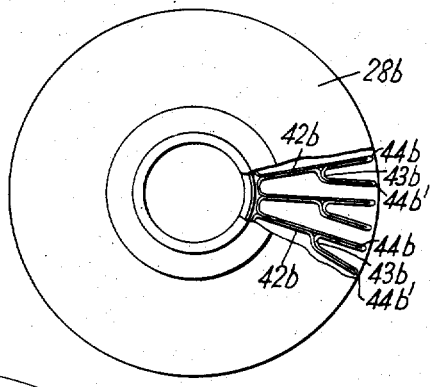
Fig. 8 is a plan, partly in section, of another filter element embodying the invention.

The filter element 28b shown in Figure 8 has folds 42b in which are secondary folds 43b so arranged that the branches 44b and 44b[1] are set at an angle, one branch 44b continuing in the direction of the radius on which lies fold 42b and the other branch 44b[1] being at a small angle to that radius.

Figure 9:
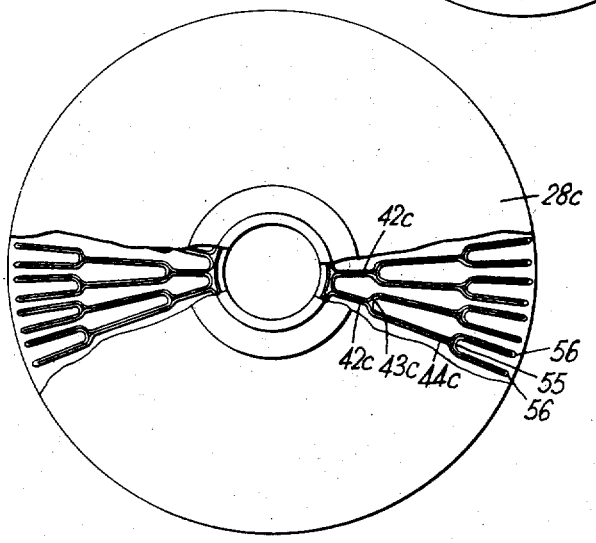
Fig. 9 is a plan, partly in section, of another filter element embodying the invention.

The filter element 28c shown in Figure 9 has folds 42c which have secondary folds 43c arranged to form branch folds 44c.' The branch folds 44c in turn have tertiary folds 55 forming branches 56, the tertiary folds 55 being formed at points radially outward of the secondary folds 43c. It will be seen that the tertiary folds as well as the secondary folds are each made up of contacting layers exterior to the filter element.

Figure 10:
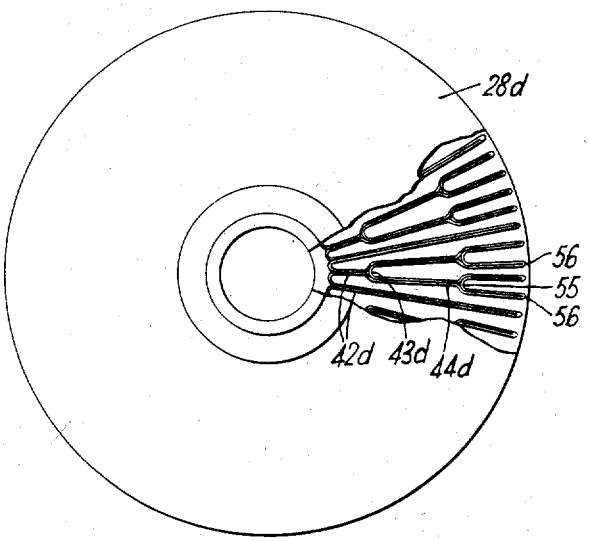
Fig. 10 is a plan, partly in section, of another filter element embodying the invention.

The filter element 28d shown in Figure 10 has folds 42d alternate ones of which have secondary folds 43d arranged to form branch folds 44d, which branch folds have in turn tertiary folds $55^1$ forming branches $56^1$.

Figure 11:
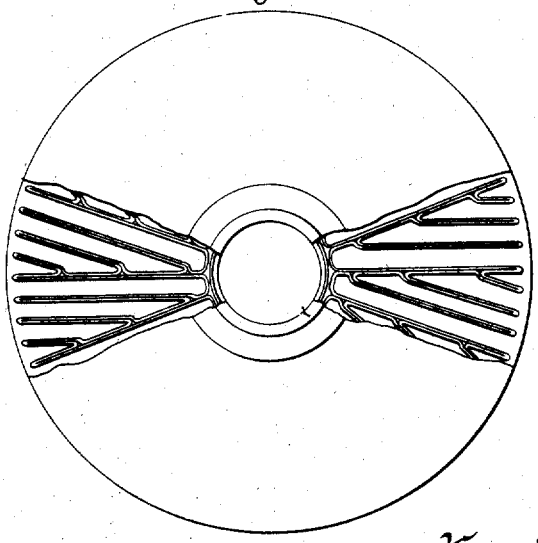
Fig. 11 is a plan, partly in section, of another filter element embodying the invention.

In Fig. 11, a modification of the invention is illustrated in which one side of each of main radial folds has joined thereto three smaller and spaced folds which are parallel to the adjacent main fold. With such a construction, a large filtering area and ample sludge capacity are provided.

Liquid flow through the filter is indicated by the arrows in Figure 2 and it is clear from the direction of flow that sludge and impurities will collect in the spaces between adjacent folds and in the spaces between the branches of secondary and tertiary folds.

The filter particularly described has special utility as an oil filter for internal combustion engines of motor vehicles.

The preferred embodiments of the invention merely illustrate and explain the invention which is not to be taken as limited to the described embodiments.

I claim:

1. A liquid filter having a filter element which comprises a central perforated tube, a pair of end plates joined by said tube, a plurality of main folds of sheet material extending outwardly and in spaced relation around said tube and fixed to said end plates, each of said main folds comprising two contacting layers of sheet material extending close up to said tube, and at least one of said main folds having a portion of one of its layers spaced from said tube formed into an outwardly extending branch fold of contacting layers forming exterior walls of said branch fold.

2. A liquid filter having a pair of end plates, a perforated central cylindrical element joining said end plates, a filter element of filter sheet material surrounding said cylindrical element, said material also joining said end plates and being folded into main folds and other folds of contacting layers extending from at least one of said main folds, said contacting layers forming exterior walls of said other folds, all of said folds extending outwardly, and adjacent main folds and adjacent other folds defining inwardly extending sludge spaces.

3. A liquid filter having filter element of filter sheet material, said material being folded into main folds and other folds of contacting layers extending from each of said main folds, said contacting layers including contacting portions forming exterior walls of said other folds, a perforated central element with an axial passage for discharge of clarified fluid, each of said main folds also comprising contacting layers of said material extending outwardly from said central element to said other folds, inwardly extending sludge pockets defined between adjacent main folds and adjacent other folds, and end plates joined to opposite ends of said central element and to all of said folds whereby fluid may be constrained to pass into said pockets, through said sheet material, along the interfaces of said contacting portions and layers and into said axial passage.

*4. A fluid filter having a pair of end plates, at least one of said end plates having an aperture, a filter element of filter sheet material joined to and cooperating with said end plates to define a central chamber communicating with said aperture for the discharge of filtered fluid, said material being folded into main folds and other folds of contacting layers extending from at least one of said main folds, said contacting layers forming exterior walls of said other folds, all of said folds extending outwardly, and adjacent main folds and adjacent other folds defining inwardly extending spaces for the reception of impurities.*

*5. A filter element comprising an elongated sheet of porous filter material formed transversely of the length thereof to provide spaced folds and formed to constitute an annulus, the oppositely disposed parts of said sheet forming said folds being in supporting contact defining flow space within said folds in communication with one side of said sheet, the surfaces of said sheet between adjacent folds of said annulus being spaced throughout the entire extent of said folds and defining pockets in open communication at the other side of said sheet, portions of certain of said folds being formed to provide branches diverging therefrom, and end plates joined to the opposite edges of said sheet and folds to retain the element in unitary assembly.*

References Cited in the file of this patent or the original patent

UNITED STATES PATENTS

| | | |
|---|---|---|
| 2,298,980 | Sloan et al. | Oct. 13, 1942 |
| 2,468,862 | Briggs | May 3, 1949 |
| 2,627,350 | Wicks | Feb. 3, 1953 |
| 2,689,652 | Gretzinger | Sept. 21, 1954 |